(12) United States Patent
Hur

(10) Patent No.: US 8,345,145 B2
(45) Date of Patent: Jan. 1, 2013

(54) MOBILE COMMUNICATION TERMINAL AND FOCUSING METHOD USING THE SAME

(75) Inventor: June Seok Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 1270 days.

(21) Appl. No.: 11/940,832

(22) Filed: Nov. 15, 2007

(65) Prior Publication Data

US 2008/0176598 A1    Jul. 24, 2008

(30) Foreign Application Priority Data

Nov. 17, 2006    (KR) .................... 10-2006-0113675

(51) Int. Cl.
*G03B 13/00*    (2006.01)
*H04M 1/00*    (2006.01)

(52) U.S. Cl. .............. 348/345; 348/346; 455/556.1
(58) Field of Classification Search ............. 348/207.99, 348/345; 345/660, 667, 668
See application file for complete search history.

(56) References Cited

U.S. PATENT DOCUMENTS

2004/0189856 A1 *    9/2004    Tanaka .................... 348/345

FOREIGN PATENT DOCUMENTS

| JP | 2004-117490 A | | 4/2004 |
| JP | 2004-208122 A | | 7/2004 |
| JP | 2005175977 A | * | 6/2005 |

* cited by examiner

*Primary Examiner* — Curtis Kuntz
*Assistant Examiner* — Sunita Joshi
(74) *Attorney, Agent, or Firm* — Birch, Stewart, Kolasch & Birch, LLP

(57) ABSTRACT

The present invention relates to a mobile communication terminal and a focusing method using the same. The mobile communication terminal includes an input unit for generating one or more input signals, a camera unit for capturing an image of a subject, a display unit having the image of the subject displayed thereon and having a screen divided into one or more regions in order to focus specific regions of the image, wherein a focusing region indicator to indicate the specific region is displayed on the screen, but region demarcation lines to demarcate the regions are not displayed on the screen, a controller for controlling each of the regions to be divided in response to the input signals in order to select the specific region, and the specific regions corresponding to the generated input signals to be focused, so that another images corresponding to the specific regions are generated, a communication module for selectively transmitting the generated images to the outside.

16 Claims, 18 Drawing Sheets

(a)

(b)

(a)          (b)

(a)　　　　　　　　　(b)

(a)　　　　　　　　(b)

(a)

(b)

(c)

(d)

(a)

(b)

(c)

(d)

(a)          (b)

(a)          (b)

(a)  (b)

MOBILE COMMUNICATION TERMINAL AND FOCUSING METHOD USING THE SAME

This Nonprovisional application claims priority under 35 U.S.C. §119 (a) on Patent Application No. 10-2006-0113675 filed in Korea on Nov. 17, 2006 the entire contents of which are hereby incorporated by reference.

BACKGROUND

1. Field

The present invention relates to a terminal and a focusing method using the same.

2. Discussion of Related Art

As the demand for mobile communication terminals increases rapidly, mobile communication terminals that provide a variety of and convenient functions have been provided.

One of the various and convenient functions provided by the mobile communication terminal is a camera function. As the camera function is included in the mobile communication terminal, a user can photograph a subject easily anywhere and anytime and exchange the picture of the subject with other users.

In the prior art, there was generally provided an auto-focus function for automatically adjusting the focus of a subject when a user presses a shutter button in order to photograph the subject using a camera.

SUMMARY

Accordingly, the present invention is to solve at least the problems and disadvantages of the background art.

The present invention enables a user to focus a desired region while viewing a displayed image clearly since region demarcation lines are not displayed.

Further, the present invention enables a user to focus one or more regions of an image.

In an aspect, a mobile communication terminal comprises an input unit for generating one or more input signals, a camera unit for capturing an image of a subject, a display unit having the image of the subject displayed thereon and having a screen divided into one or more regions in order to focus specific regions of the image, wherein a focusing region indicator to indicate the specific region is displayed on the screen, but region demarcation lines to demarcate the regions are not displayed on the screen, a controller for controlling each of the regions to be divided in response to the input signals in order to select the specific region, and the specific regions corresponding to the generated input signals to be focused, so that another images corresponding to the specific regions are generated, and a communication module for selectively transmitting the generated images to the outside.

The controller may control directions in which the focusing region indicator is movable to be displayed.

The controller may control the focused specific region or the focusing region indicator to be highlighted.

The input unit may control one of a keypad, a touch keypad, a jog disk, a jog dial, and a jog shuttle.

The controller may control a key, corresponding to the focused specific region, to emit light when the input unit is the keypad or the touch keypad.

The controller may control the regions to be divided with different sizes.

The size of the region is changed by a user.

The number of the regions may be changed by a user.

If two or more input signals are generated from the input unit, the controller may control the specific regions corresponding to the two or more input signals to be multi-focused at the same time.

The mobile communication terminal may further comprise a memory unit for storing the image of the specific region. If the specific region is focused, the controller may control the image of the specific region to be captured and then stored in the memory unit.

The divided regions on the display unit may be set to a plurality of groups, and if any one of the divided regions is selected, the controller may control a region corresponding to a group including the selected region to be focused.

In another aspect, a focusing method comprises a capturing step of capturing an image of a subject, a dividing step of dividing a screen on which the image of the subject is displayed into one or more regions in order to focus a specific region of the image, wherein region demarcation lines to demarcate the region are not displayed on the screen, a display step of displaying a focusing region indicator to indicted the specific region, an input step of generating one or more input signals, a focusing step of focusing specific regions of the displayed image corresponding to the input signals, an image generating step of generating images on which the specific regions are focused, and selectively transmitting the generated images to the outside.

In the focusing step, directions in which the focusing region indicator is movable may be displayed.

In the focusing step, the focused specific region or the focusing region indicator may be highlighted.

In the input step, the input signals may be generated from an input unit comprising one of a keypad, a touch keypad, a jog disk, a jog dial, and a jog shuttle.

In the focusing step, when the input unit is the keypad or the touch keypad, a key corresponding to the focused region may emit light.

In the dividing step, the divided regions may be divided with different sizes.

The size of each of the divided regions may be changed by a user.

The number of the divided regions may be changed by a user.

In the focusing step, if two or more input signals corresponding to the divided regions are generated in the input signal generating step, specific regions corresponding to the two or more input signals may be multi-focused at the same time.

In the image generating step, an image of a corresponding focused region is captured. The focusing method may further comprise a storage step of storing the captured image.

The divided regions may be set to a plurality of groups. In the focusing step, if any one of the divided regions is selected, a region corresponding to a group including the selected region may be focused at the same time.

DETAILED DESCRIPTION OF EMBODIMENTS

A mobile communication terminal and a focusing method using the same according to the present invention will now be described in detail in connection with specific embodiments with reference to the accompanying drawings.

Figure 1:
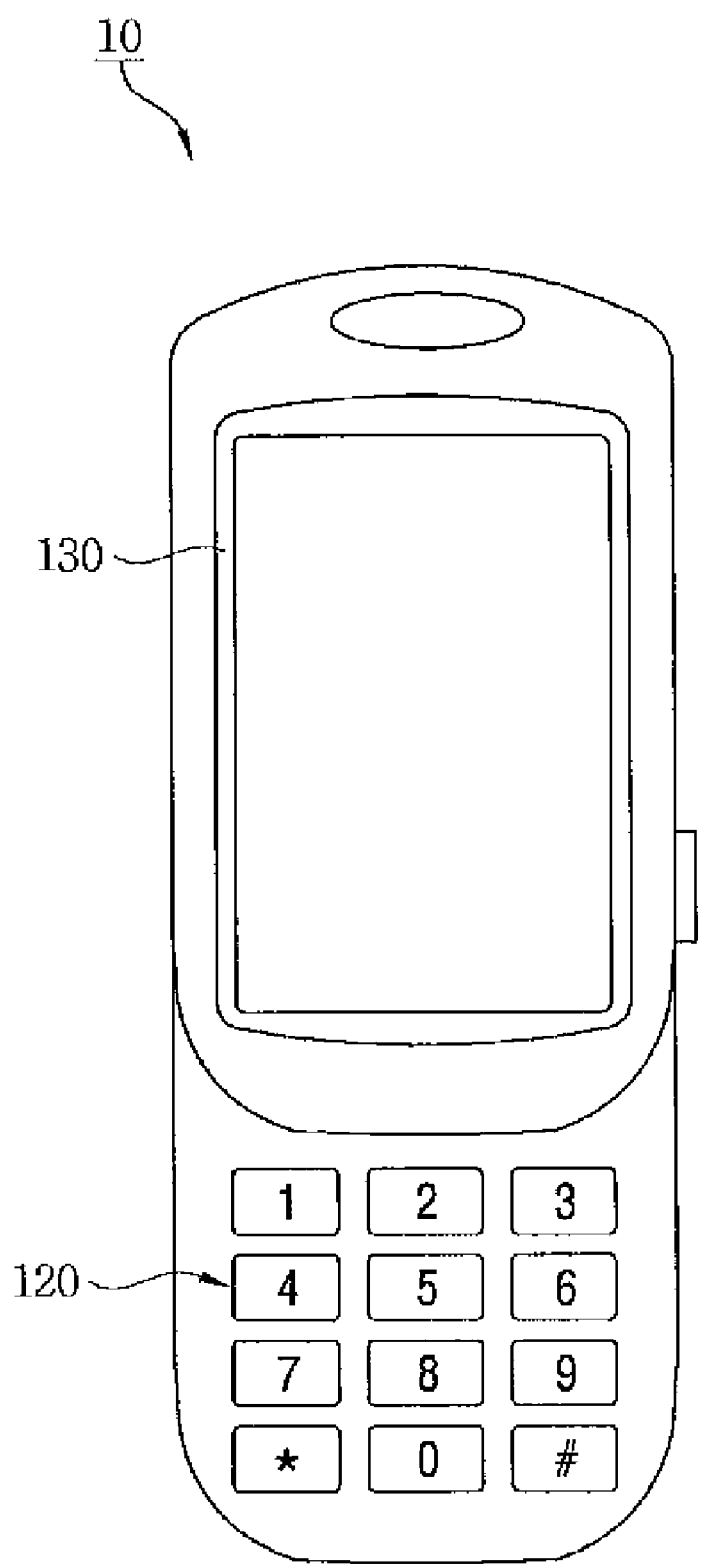
FIG. 1 is a front view of a mobile communication terminal according to an embodiment of the present invention.

FIG. 1 is a front view of a mobile communication terminal according to an embodiment of the present invention.

Referring to FIG. 1, a mobile communication terminal 10 according to an embodiment of the present invention comprises an input unit 120 equipped with a plurality of keypads and a display unit 130.

The display unit 130 is divided into regions on which region demarcation lines are not displayed so that the regions correspond to a number of input signals of the input unit 120. If one or more input signals are generated from the input unit 120, a corresponding specific region of a picture displayed on the display unit 130 is focused. This construction according to an embodiment of the present invention is described in more detail below with reference to FIG. 2.

Figure 2:
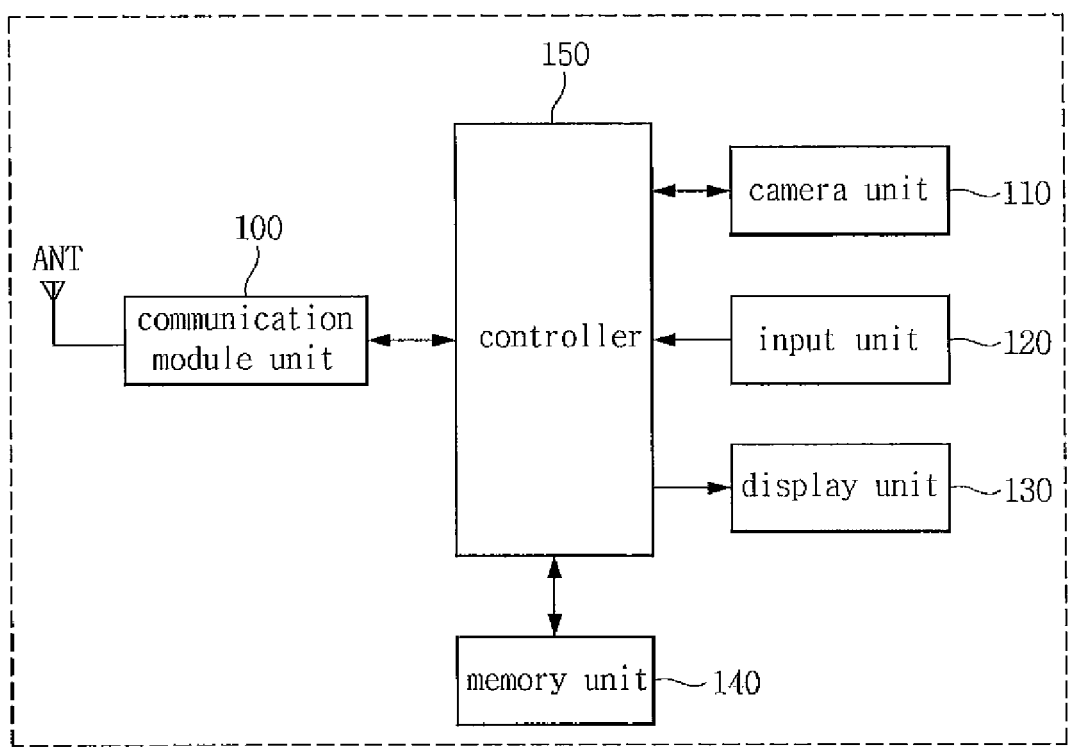
FIG. 2 is a block diagram showing an internal construction of the mobile communication terminal according to an embodiment of the present invention.

FIG. 2 is a block diagram showing an internal construction of the mobile communication terminal according to an embodiment of the present invention.

Referring to FIG. 2, the mobile communication terminal of the present invention comprises a communication module unit 100, a camera unit 110, the input unit 120, the display unit 130, a memory unit 140, and a controller 150.

The communication module unit 100 receives data from a base station and transmits data, such as images generated by the mobile communication terminal 10, to the base station via an antenna ANT through communication with the base station.

The camera unit 110 photographs a subject.

The input unit 120 comprises a keypad equipped with numeric keys and various function keys, and generates an input signal corresponding to a key selected by a user. The input unit 120 may also generate corresponding input signals when a user selects two or more keys.

The display unit 130 is configured to display contents received from the communication module unit 100, a variety of information signals, images of subjects captured by the camera unit 110, and so on. At this time, the display unit 130 has a screen divided into one or more regions in order to focus a specific region of an image. A focus region indicator to indicate a specific region is displayed on the display unit 130, but region demarcation lines to demarcate regions are not displayed on the display unit 130.

The memory unit 140 may comprise flash memory, RAM, electrically erasable programmable read only memory (EEPROM) or the like. The memory unit 140 is configured to store a program for controlling an overall operation of the mobile communication terminal 10. The memory unit 140 also stores images received from the communication module unit 100, images captured by the camera unit 110, and specific regions of an image that is focused and captured.

The controller 150 comprises a mobile station modem (MSM), and controls general inputs and outputs of the mobile communication terminal 10. The controller 150 controls the display unit 130 to be divided into regions on which region demarcation lines are not displayed so that the regions correspond to one or more input signals of the input unit 120. If one or more input signals are generated from the input unit 120, the controller 150 controls corresponding specific regions of an image displayed on the display unit 130 to be focused so that images corresponding to the specific regions are generated.

The construction of the camera unit 110 of the mobile communication terminal 10 is described in short below with reference to FIG. 3.

Figure 3:
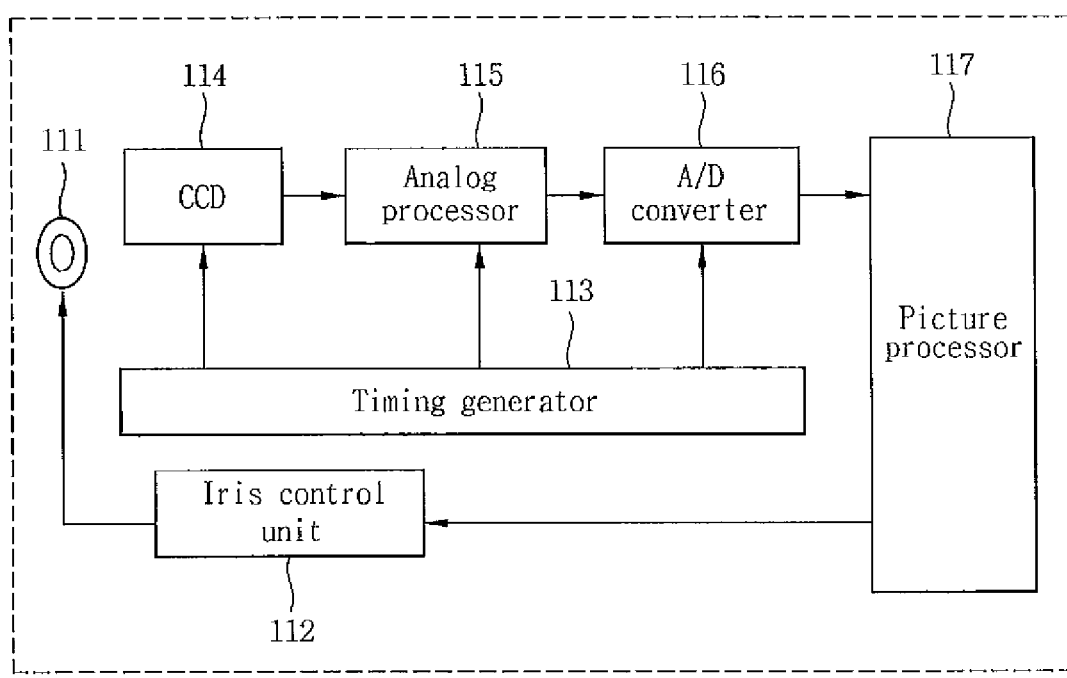
FIG. 3 is a detailed block diagram of a camera unit shown in FIG. 2.

FIG. 3 is a detailed block diagram of the camera unit shown in FIG. 2.

As shown in FIG. 3, the camera unit 110 comprises an iris control unit 112, a timing generator 113, a charged coupled device (CCD) 114, an analog processor 115, an analog/digital (A/D) converter 116, and a picture processor 117.

The iris control unit 112 outputs a signal for controlling the amount of incident light to the camera lens 111.

The timing generator 113 generates various timings necessary for an operation of the camera unit 110.

The CCD 114 is a picture sensor for converting an optical signal, which is received through a camera lens 111, into an electrical signal and outputting a converted signal.

The analog processor 115 latches a signal received from the CCD 114, performs processes, such as double sampling, gain flare, shading correction, and pre-gamma correction, on the signal, and outputs an analog image signal.

The A/D converter 116 converts the analog image signal into a digital signal.

The picture processor 117 performs various image processes, such as white balancing, dealer correction, data detection, and gamma correction, on the image signal received from the A/D converter 116. The picture processor 117 also compresses and outputs various pieces of processed image data.

The above constituent elements belong to the camera unit 110 of a general mobile communication terminal 10 and are operated under the control of the controller 150. Corresponding image signals are stored in the memory unit 140 per frame basis.

An operation of the present invention is described below.

Embodiment

When Keypad is Used

Figure 4:
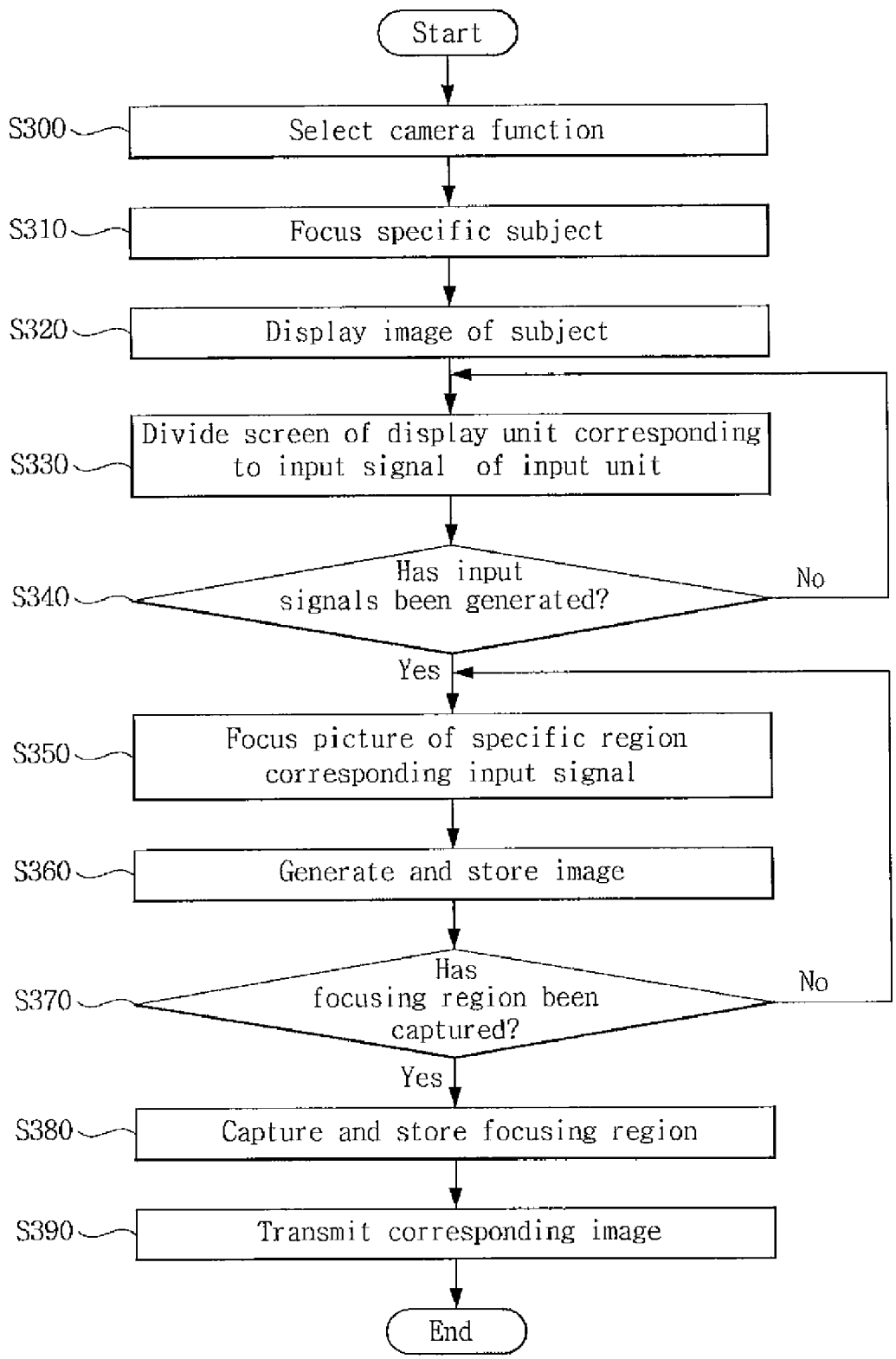
FIG. 4 is a flowchart illustrating a focusing method according to an embodiment.
Figure 5:
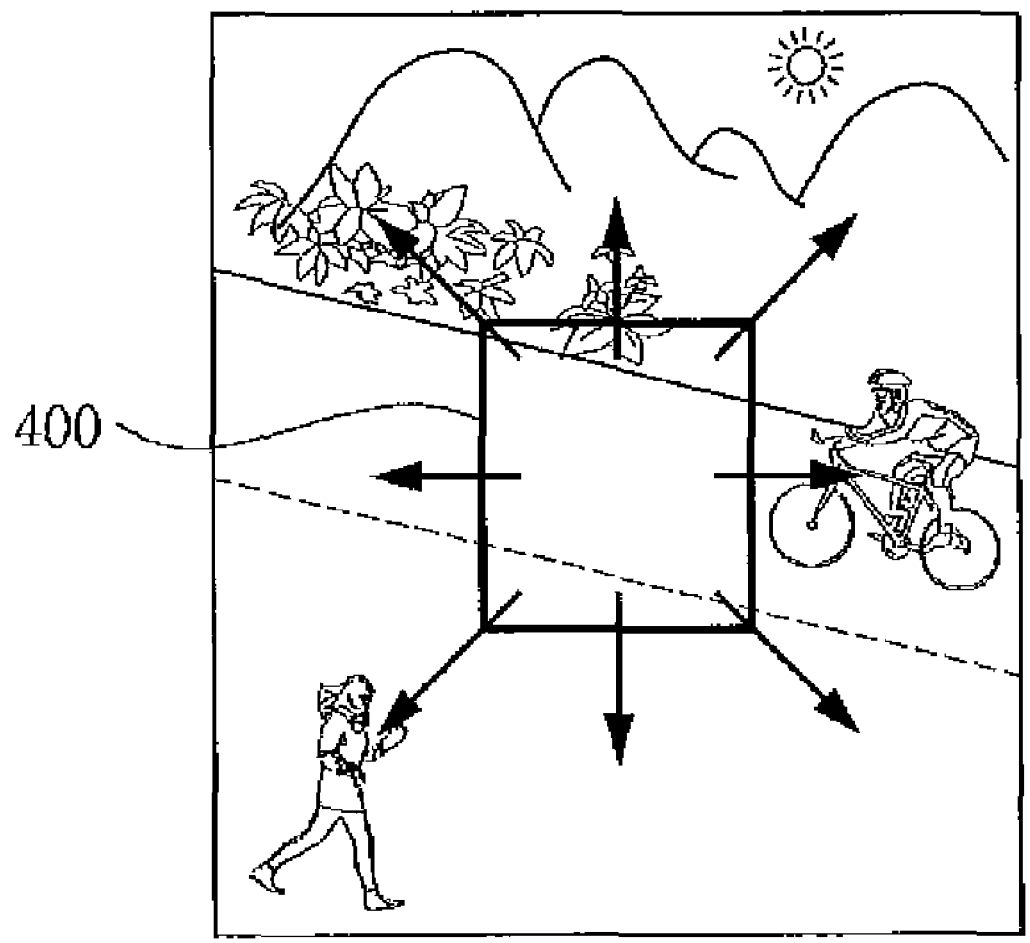
FIG. 5 is an exemplary view illustrating that a focusing region indicator for selecting a specific region is displayed according to an embodiment.

FIG. 4 is a flowchart illustrating a focusing method according to an embodiment. FIG. 5 is an exemplary view illustrating that a focusing region indicator for selecting a specific region is displayed according to an embodiment.

If a user selects the camera function in the menu, the controller 150 turns on the camera unit 110 in step S300. If the camera unit 110 aims at a specific subject in step S310, an image of a corresponding subject is displayed on the screen of the display unit 130 in step S320 as illustrated in FIG. 5.

The controller 150 may divide the display unit 130 in response to one or more input signals that can be generated from the input unit 120. The controller 150 may control a focusing region indicator 400 for selecting a specific one of divided regions to be displayed on the display unit 130. This is described in more detail below.

Figure 6:
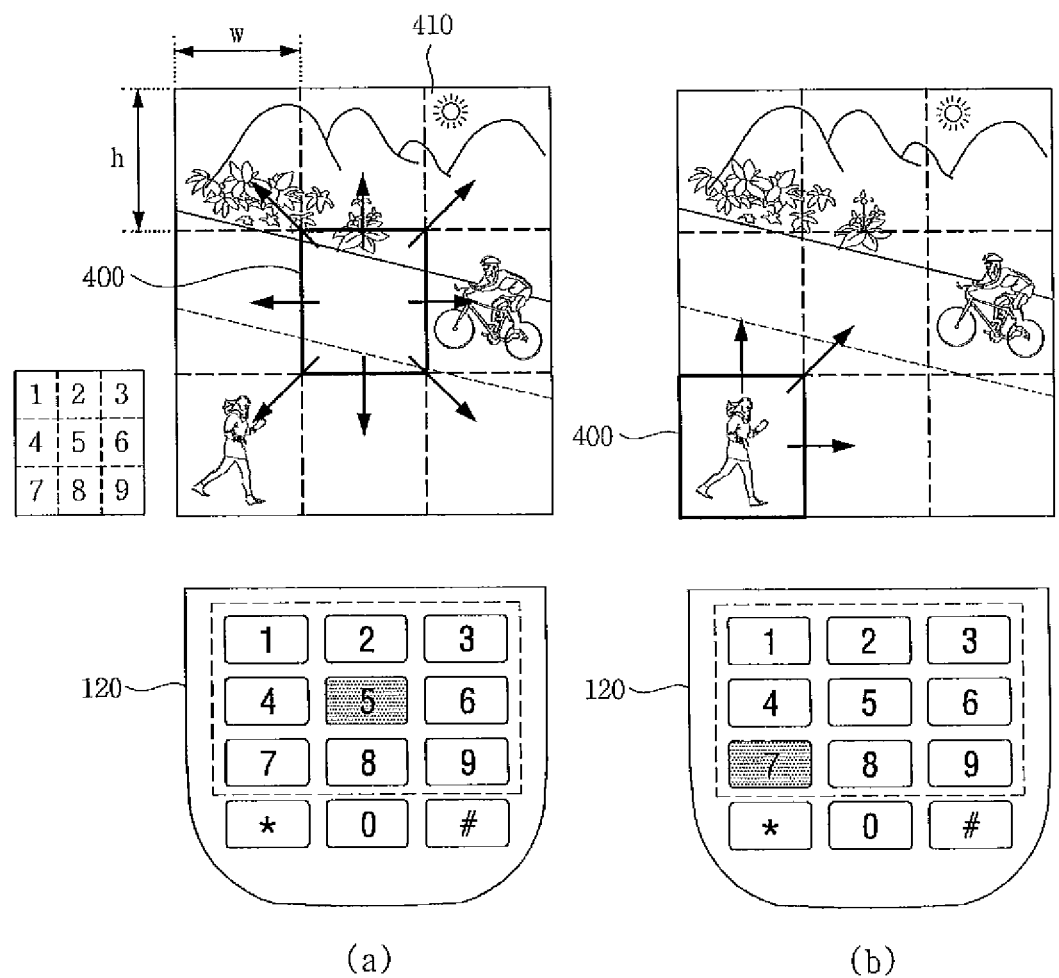
FIG. 6 shows an example in which a specific region is selected in response to an input signal according to an embodiment.
Figure 7:
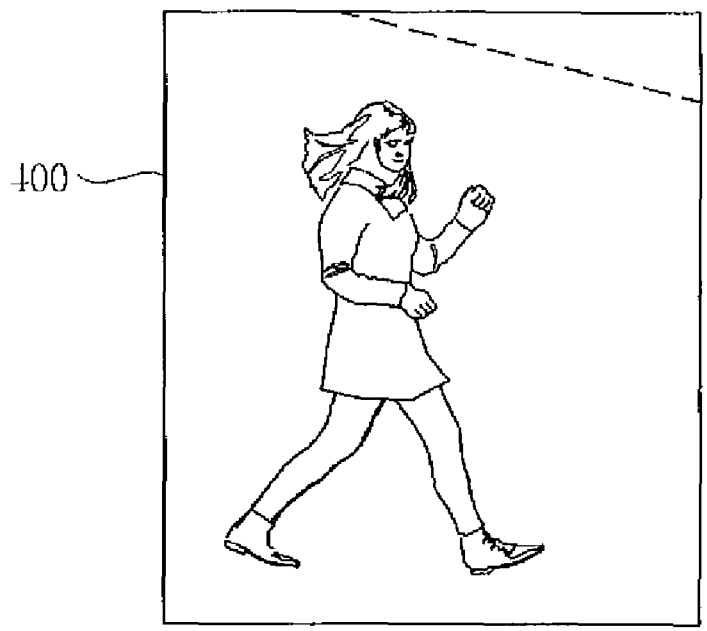
FIG. 7 shows an example in which a specific region selected in FIG. 6 is captured.

FIG. 6 shows an example in which a specific region is selected in response to an input signal according to an embodiment. FIG. 7 shows an example in which the specific region selected in FIG. 6 is captured.

As illustrated in FIG. 6(a), the controller 150 controls an image of a subject to be displayed on the display unit 130 and, at the same time, the display unit 130 to be divided into regions on which region demarcation lines 410 are displayed in response to key input signals of the input unit 120 in step S330. In the drawings, portions indicated by a dotted line designate the region demarcation lines 410 and refers to lines for demarcating divided regions of the display unit 130. It is to be noted that the region demarcation lines 410 indicated by the dotted line in FIG. 6(a) are shown to describe the concept of divided regions and are not actually displayed on the display unit 130.

The controller 150 may control the display unit 130 to be equally divided into regions respectively having a width w and a length h. The divided regions correspond to the input signals generated by the keys of the input unit 120.

In other words, if specific keys are selected in such a manner that locations of keys 1, 2, 3 . . . 8, and 9 of the input unit 120 sequentially correspond to divided regions of the display unit 130, corresponding divided regions of the display unit 130 are selected and focused.

The controller 150 may control a specific key of the input unit 120, which corresponds to a focused region of the display unit 130, to emit light. The controller 150 may also control the focusing region indicator 400 to be displayed in box form in order to display the focused region of the display unit 130. The focusing region indicator 400 may be used to select a specific region of an image displayed on the display unit 130.

The controller 150 may also control a key of the input unit 120, which corresponds to a region where the focusing region indicator 400 is located, to emit light on the display unit 130. Alternatively, the controller 150 may control a key of the input unit 120, which corresponds to a region where the focusing region indicator 400 is located, to emit light on the display unit 130 with a color different from that of other keys, or may also control only a corresponding key to flicker with the same color as that of other keys.

If an image of a subject captured by the camera unit 110 is displayed on the display unit 130, the focusing region indicator 400 is displayed at a location set by default. For example, the focusing region indicator 400 may be displayed at the center of the display unit 130 (that is, the location of a region corresponding to the No. 5 key of the input unit 120) by default, as illustrated in FIG. 6(a).

The controller 150 may also control arrows to be displayed in up-and-down and right-and-left directions and a diagonal direction in which the focusing region indicator 400 is movable in order for a user to easily select a focusing region.

If the focusing region indicator 400 is displayed on the display unit 130 as described above, the controller 150 determines whether a specific key is pressed in the input unit 120 and an input signal is generated in step S340.

If, as a result of the determination in step S340, the No. 7 key of the input unit 120 is pressed by a user as illustrated in FIG. 6(b) and a corresponding input signal is generated, the controller 150 controls the focusing region indicator 400 to move to a corresponding divided region of the display unit 130. The controller 150 then focuses an image of the region where the focusing region indicator 400 is located in step S350. The focusing region indicator 400 may be highlighted with frames being indicated by a bold line.

Thereafter, the controller 150 controls the image displayed on the display unit 130 to be stored in the memory unit 140 in step S360.

The controller 150 then determines whether a capture signal of an image where the focusing region indicator 400 is located has been input from the input unit 120 in step S370. If, as a result of the determination in step S370, the capture signal of the image has been input from the input unit 120, the controller 150 captures the image where the focusing region indicator 400 is located as illustrated in FIG. 7 and then controls the captured image to be stored in the memory unit 140 in step S380.

At this time, only an image in which the focusing region indicator 400 is located and that is focused and divided picture may be captured and stored without storing the entire images displayed on the display unit 130.

In the above embodiment, an example in which only arrows are displayed in up-and-down, and right-and-left directions and a diagonal direction in which the focusing region indicator 400 is movable has been described. However, the present invention is not limited to the above embodiment. An alternative embodiment is described below with reference to FIGS. 8a and 8b.

Figure 8A:
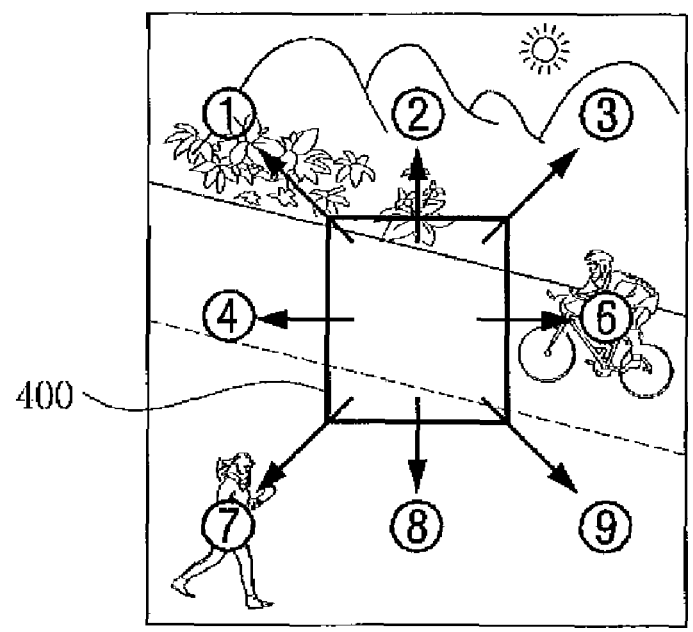
FIGS. 8a and 8b show examples illustrating directions in which a focusing region indicator is movable.
Figure 8B:
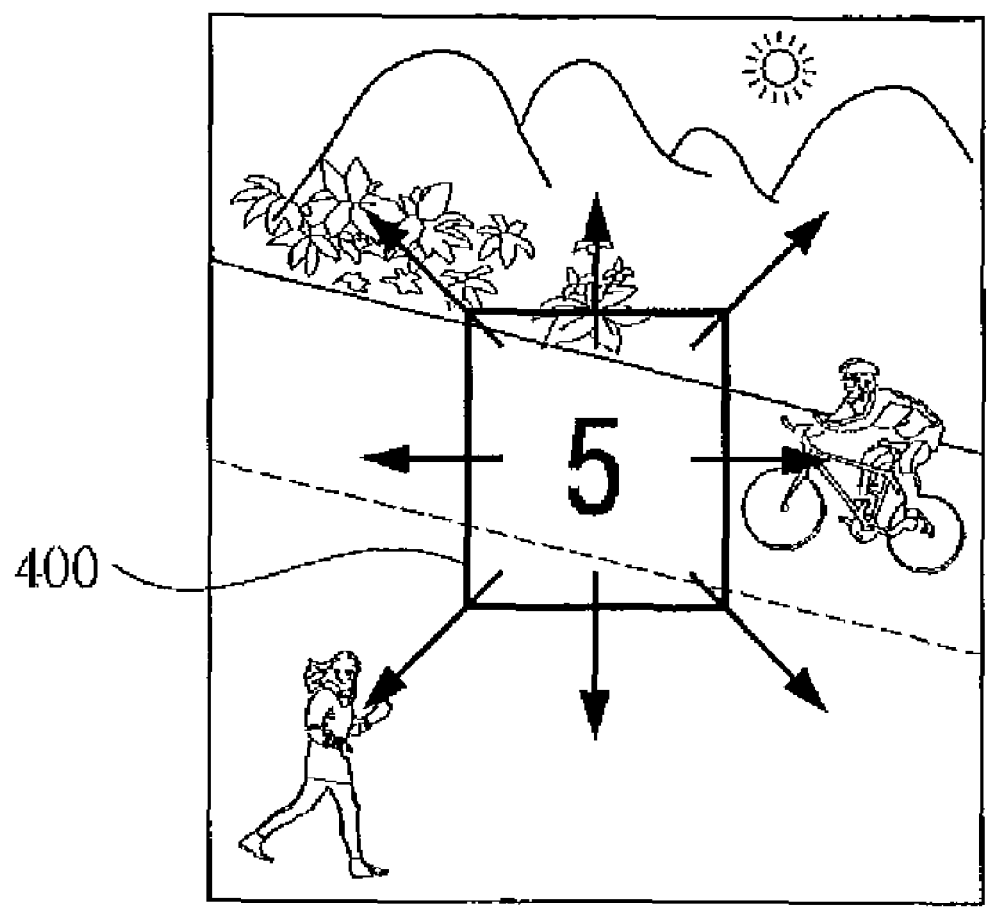

FIGS. 8a and 8b show examples illustrating directions in which a focusing region indicator is movable.

As described above, directions in which the focusing region indicator 400 is movable are displayed as illustrated in FIG. 8a. Key numbers of the input unit 120 corresponding to the respective directions may also be displayed in order for a user to check a corresponding number and then select the key of the input unit 120.

The key numbers of the input unit 120 corresponding to the respective directions may be displayed temporarily and then disappear, or may be continuously displayed until a user selects a specific region.

Alternatively, as illustrated in FIG. 8b, a key number of the input unit 120 corresponding to a region where the focusing region indicator 400 is located may be displayed on the focusing region indicator 400 in order for a user to easily check keys of the input unit 120 corresponding to other regions. Alternatively, a combination of the method illustrated in FIG. 8a and the method illustrated in FIG. 8b may be used.

In the above embodiment, a single focusing method of focusing only one of regions divided on the display unit 130 has been described. It is however to be noted that the present invention is not limited to the above embodiment, but may be implemented in various ways. One of possible embodiments is described below with reference to FIG. 9.

Figure 9:
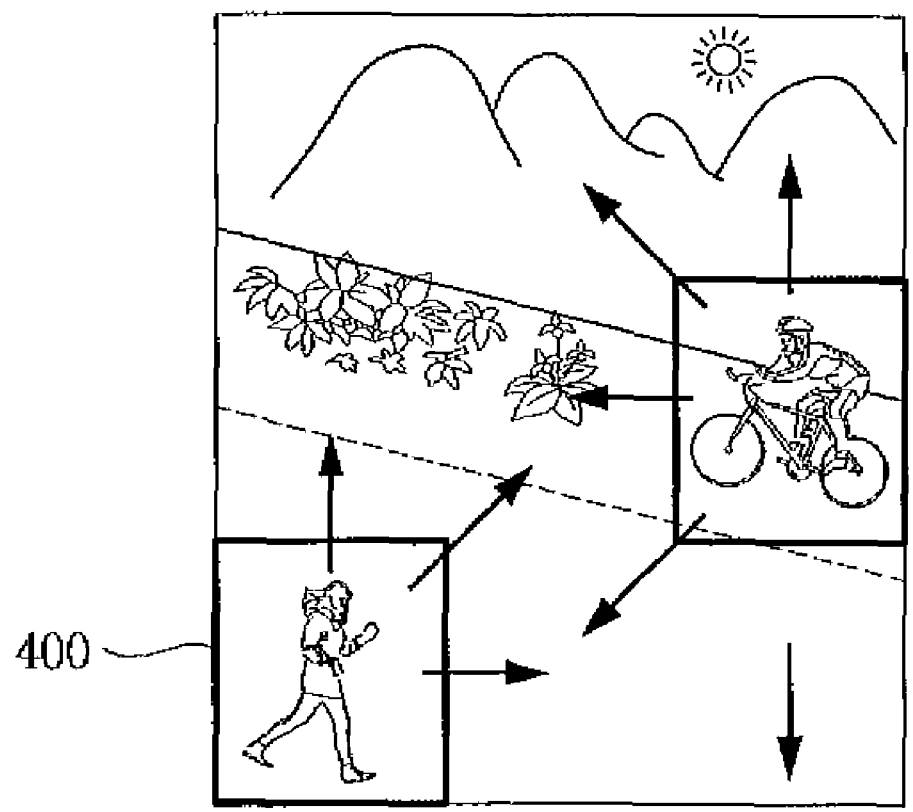
FIG. 9 shows an example in which corresponding regions are multi-focused at the same time when two input signals are generated.
Figure 9:
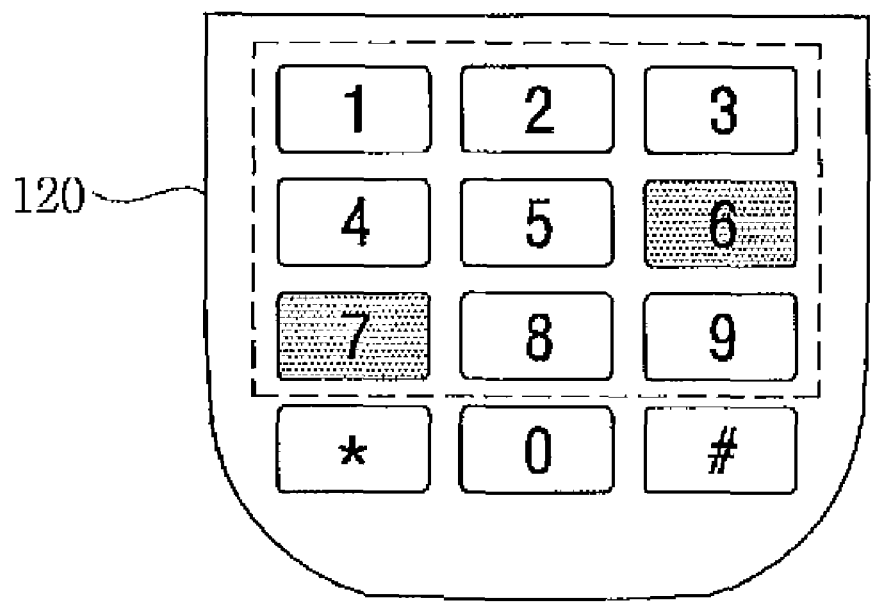
Figure 10:
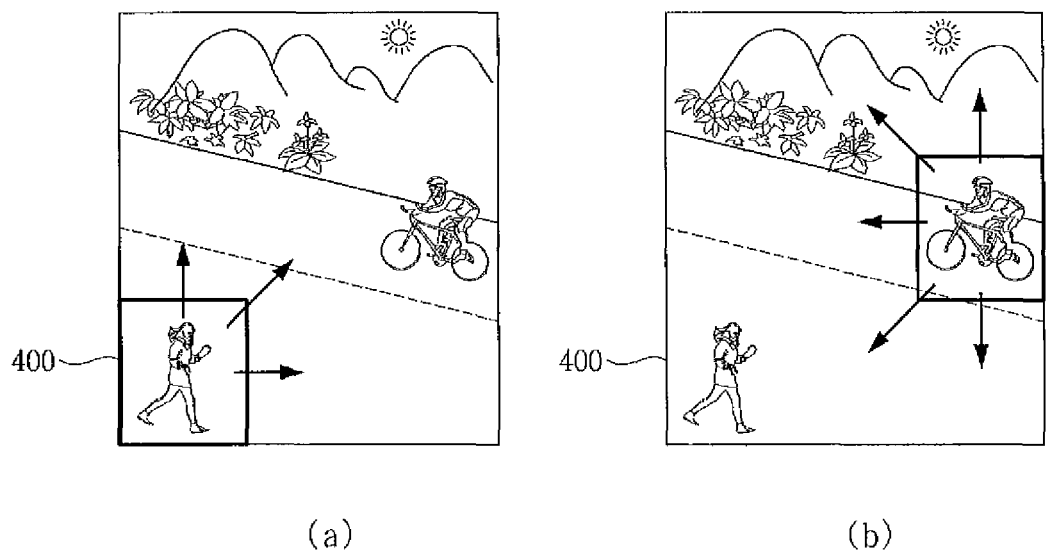
FIG. 10 shows an example in which multi-focusing is performed.

FIG. 9 shows an example in which corresponding regions are multi-focused at the same time when two input signals are generated. FIG. 10 shows an example in which multi-focusing is performed.

Input signals are generated at the same time from the Nos. 6 and 7 keys of the input unit 120 as illustrated in FIG. 9. The controller 150 controls two regions of an image displayed on the display unit 130, which correspond to the input signals of the input unit 120, to be focused.

This is described sequentially. The controller 150 controls a region of the image displayed on the display unit 130, which corresponds to the input signal of the No. 7 key of the input unit 120, to be focused as illustrated in FIG. 10(a). The controller 150 then controls a region of the image displayed on the display unit 130, which corresponds to the input signal of the No. 6 key of the input unit 120, to be focused as illustrated in FIG. 10(b). Thereafter, the controller 150 controls multi-focusing to be enabled through the principle of combining the two screens.

According to this principle, the controller 150 may control corresponding regions of the display unit 130 to be focused when input signals are generated from two or more of the keys of the input unit 120.

It has been described above that the Nos. 6 and 7 keys of the input unit 120 are selected at the same time. However, the present invention is not limited to the above embodiment. For example, the multi-focusing method may also be applied when the No. 7 key of the input unit 120 is pressed within a specific time after the No. 6 key of the input unit 120 is pressed.

The term "specific time" refers to time shorter than time taken for a user to select a region corresponding to the No. 7 key of the input unit 120 after selecting a region corresponding to the No. 6 key of the input unit 120.

For example, a user may select a region corresponding to the No. 7 key of the input unit 120 after 1 second elapses since a region corresponding to the No. 6 key of the input unit 120 is selected. At this time, the controller 150 may recognize the operation as an operation in which the focusing region indicator 400 is located at the region corresponding to the No. 6 key of the input unit 120 and is then moved to the region corresponding to the No. 7 key of the input unit 120.

However, if a user selects the region corresponding to the No. 7 key of the input unit 120 after 0.5 second elapses since the region corresponding to the No. 6 key of the input unit 120 is selected, the controller 150 may recognize the operation as an operation in which the focusing region indicator 400 is located at both the region corresponding to the No. 6 key of the input unit 120 and the region corresponding to the No. 7 key of the input unit 120. The specific time may be arbitrarily set by a user.

In the above embodiment, it has been described that the number of divided regions is 9. It is however to be noted that the present invention is not limited to the above embodiment. An alternative embodiment is described below with reference to FIG. 11.

Figure 11:
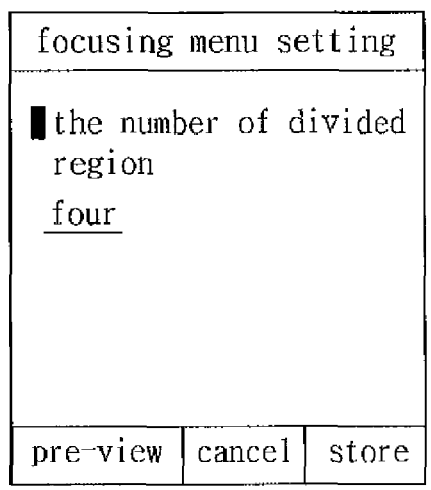
FIG. 11 shows an example in which the number of divided regions is set.
Figure 11:
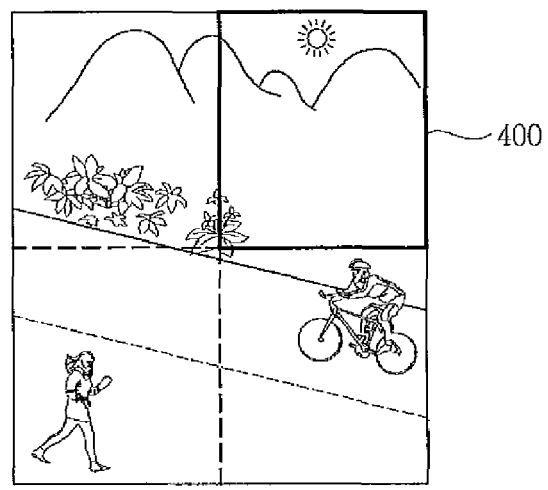
Figure 11:
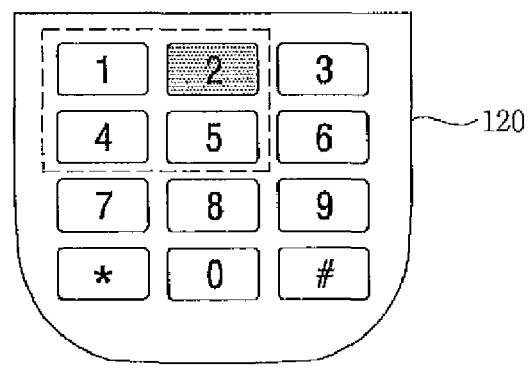

FIG. 11 shows an example in which the number of divided regions is set.

The number of divided regions may be set to "4" as illustrated in FIG. 11(a). The divided regions are viewed through a pre-view menu. The display unit 130 is divided into four regions as illustrated in FIG. 11(b). At this time, the location of the focusing region indicator 400 may also be set by default.

If the display unit 130 is divided into the four regions as described above, the Nos. 1, 2, 4, and 5 keys of the input unit 120 may be used. However, the present invention is not limited to this example, but the keys of the input unit 120 may be arbitrarily selected by a user.

In the above embodiments, it has been described that regions of the display unit 130 are divided equally. However, the present invention is not limited to the embodiments. For example, regions of the display unit 130 may be divided with different sizes. This is described below with reference to FIG. 12.

Figure 12:
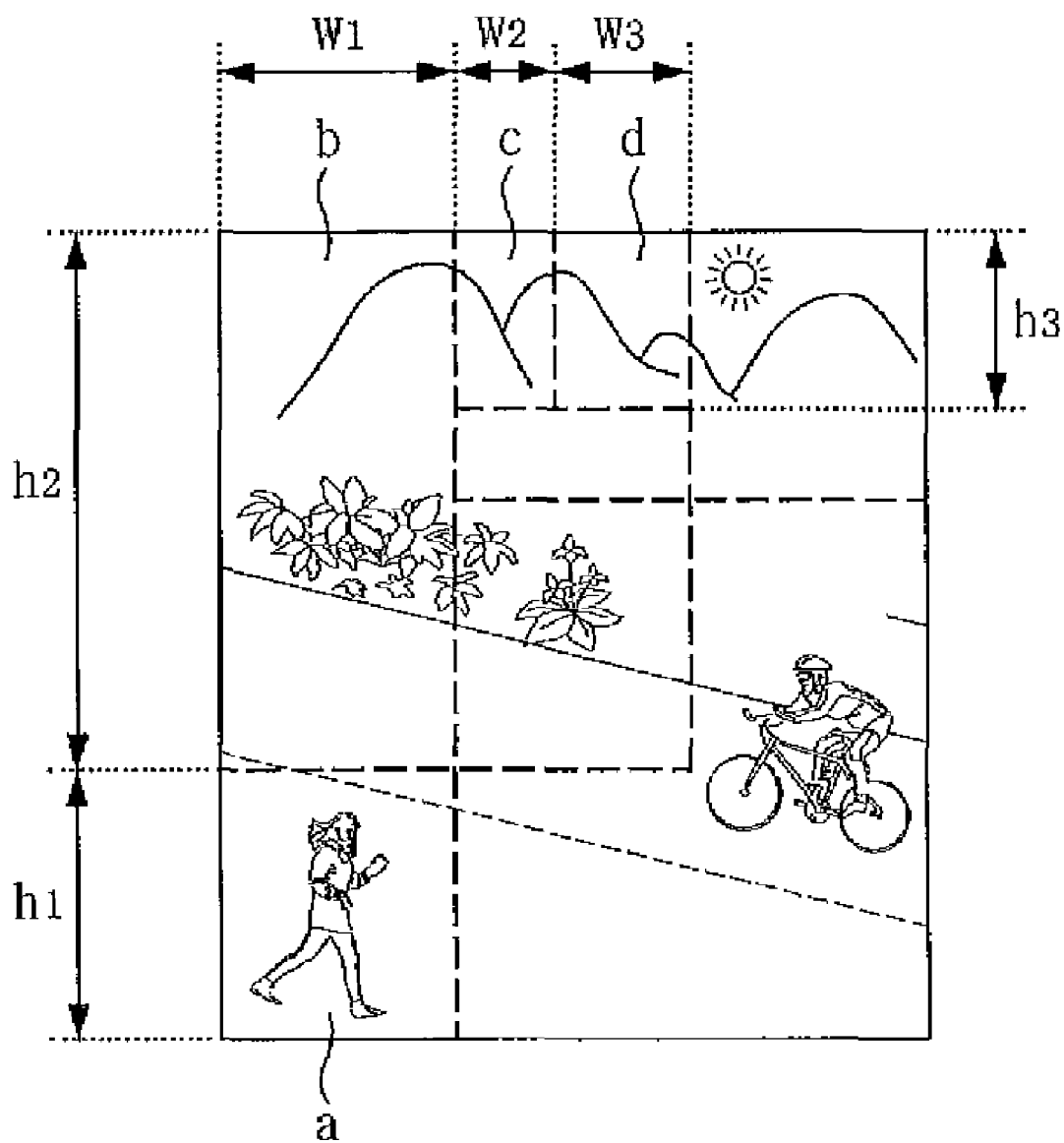
FIG. 12 shows an example in which divided regions are divided differentially.

FIG. 12 shows an example in which divided regions are divided differentially.

Regions of the display unit 130 may be divided with different sizes as illustrated in FIG. 12. In other words, regions "a, b, c and d" of divided regions of the display unit 130 may be divided with different widths and lengths.

For example, the region "a" may have a length $h_1$ and a width $w_1$, and the region "b" may have a length $h_2$, which is different from the length $h_1$ of the region a, and the width $w_1$. The region "c" may have a length $h_3$ and a width $w_2$, and the region "d" may have the length $h_3$ and a width $w_3$.

If the regions of the display unit 130 are divided with different sizes as described above, an image displayed on the display unit 130 can be further divided and focused. In the present invention, the size of a divided region of the display unit 130 may be arbitrarily set by a user.

Figure 13:
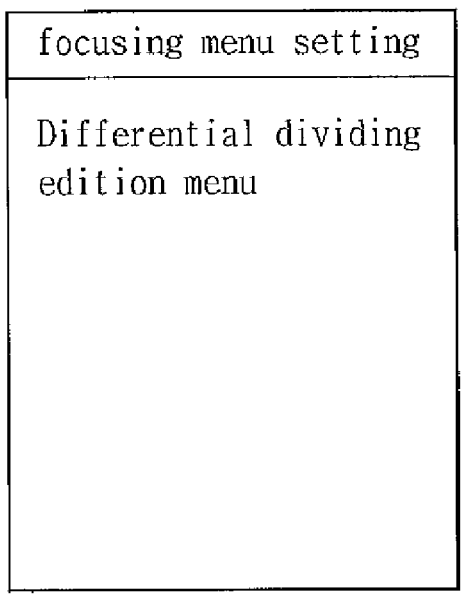
FIG. 13 shows an example in which region indicators are amalgamated when a divided region is divided differentially.
Figure 13:
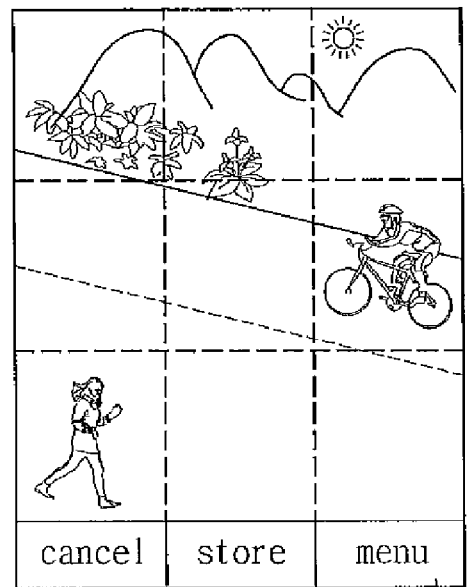
Figure 13:
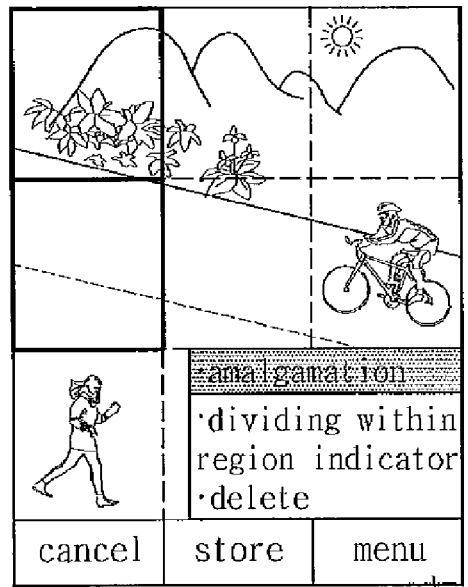
Figure 13:
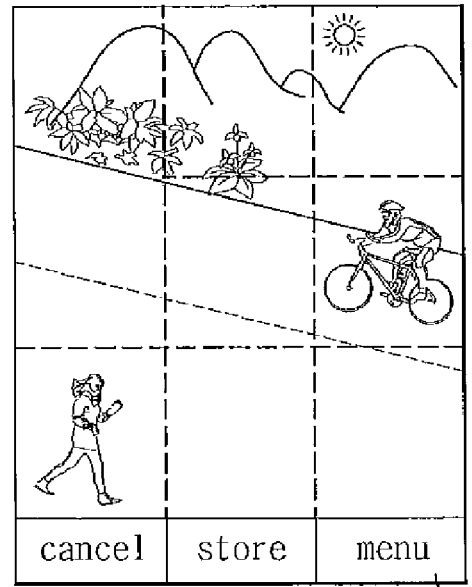

FIG. 13 shows an example in which region indicators are amalgamated when a divided region is divided differentially.

A "focus setting menu" may be selected in order to set a differential dividing menu as illustrated in FIG. 13(a). If a "differential dividing edition menu" is selected, the controller 150 controls the region demarcation lines 410, which equally demarcate the display unit 130 on which an image now captured by the camera unit is displayed, to be displayed as illustrated in FIG. 13(b).

It a user selects a menu 500 with the Nos. 1 and 4 keys of the input unit 120 being selected as illustrated in FIG. 13(c), the controller 150 controls "amalgamation", "dividing within region indicator" and "delete" menus to be displayed on the display unit 130.

If the user selects the "amalgamation" menu, the controller 150 controls divided regions of the display unit 130, which correspond to the Nos. 1 and 4 keys of the input unit 120, to be amalgamated as illustrated in FIG. 13(d).

Alternatively, in the present embodiment, a region that is already divided may be divided into regions. This alternative embodiment is described below with reference to FIG. 14.

Figure 14:
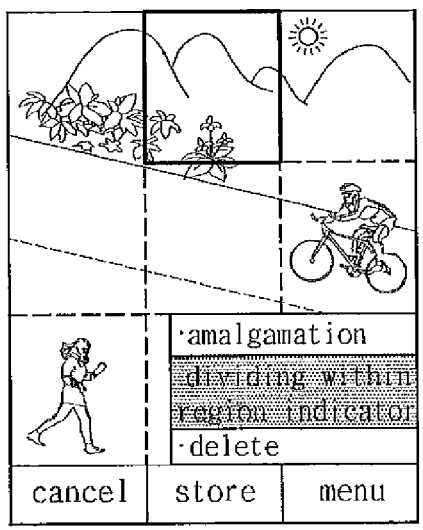
FIG. 14 shows an example in which a region within a region indicator is divided again when a divided region is divided differentially.
Figure 14:
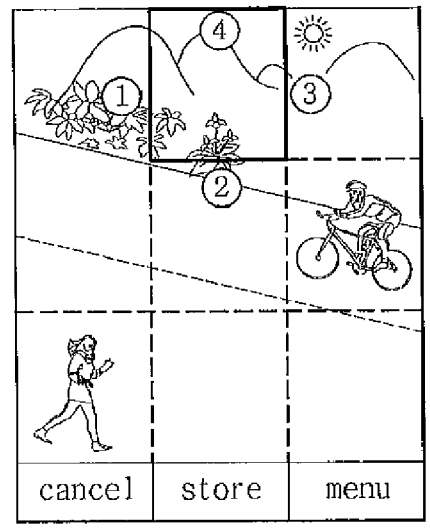
Figure 14:
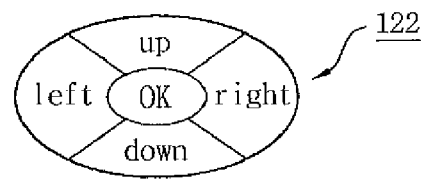
Figure 14:
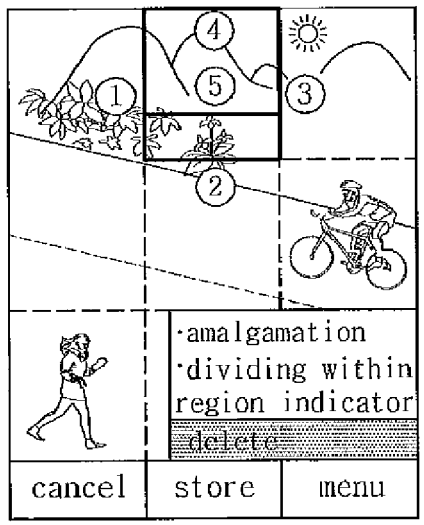
Figure 14:
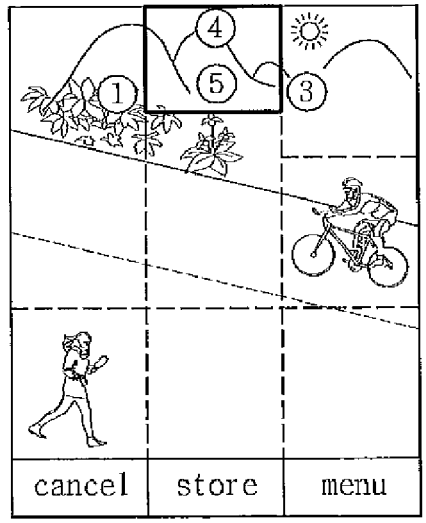

FIG. 14 shows an example in which a region within a region indicator is divided again when a divided region is divided differentially.

As described above with reference to FIG. 13(a), the "focus setting menu" may be selected in order to set the differential dividing menu. If the differential dividing edition menu is selected, the controller 150 controls the region demarcation lines 410, which equally demarcate the display unit 130 on which an image now captured by the camera unit is displayed to be displayed as illustrated in FIG. 14(a).

If a user selects the menu 500 with the No. 2 key of the input unit 120 being selected, the controller 150 controls the "amalgamation", "dividing within region indicator", and "delete" menus to be displayed on the display unit 130. The user selects the "dividing within region indicator" menu.

In response to the user's selection, the controller 150 assigns small numbers to four sides of a divided region as illustrated in FIG. 14(b). The small numbers may include symbols, alphabets, a combination of them, and so on.

In this state, if an input signal corresponding to a small number No. 2 is generated, the controller 150 controls a corresponding small number to be edited. For example, after the input signal corresponding to the small number No. 2 is generated, an upward direction key of the direction key 122 may be pressed. Thus, the controller 150 controls the side corresponding to the small number No. 2 to be moved upwardly.

The user then selects the "delete" menu in the menu 500 and thus selects a key corresponding to the small number No. 2 as illustrated in FIG. 14(c). In response to the user's selection, the controller 150 controls a line corresponding to the small number No. 2 to be deleted and then the results to be displayed on the display unit 130 as illustrated in FIG. 14(d).

In a similar way, a divided region may be divided again by selecting a small number and selecting some of a corresponding region demarcation line 410 as much as desired using the direction key 122.

At this time, if the direction key 122 of the input unit 120 is pressed once, a line corresponding to the small number is moved by some degree, enabling fine control. This movement using the direction key 122 may be arbitrarily changed by a user, such as movement on a pixel basis.

As described above, a divided region can be easily edited through deletion of a line corresponding to a small number, dividing within a region, and amalgamation.

This focusing method may also be applied to various application fields as well as photographing. An example of the application fields is described below with reference to FIG. 15.

Figure 15:
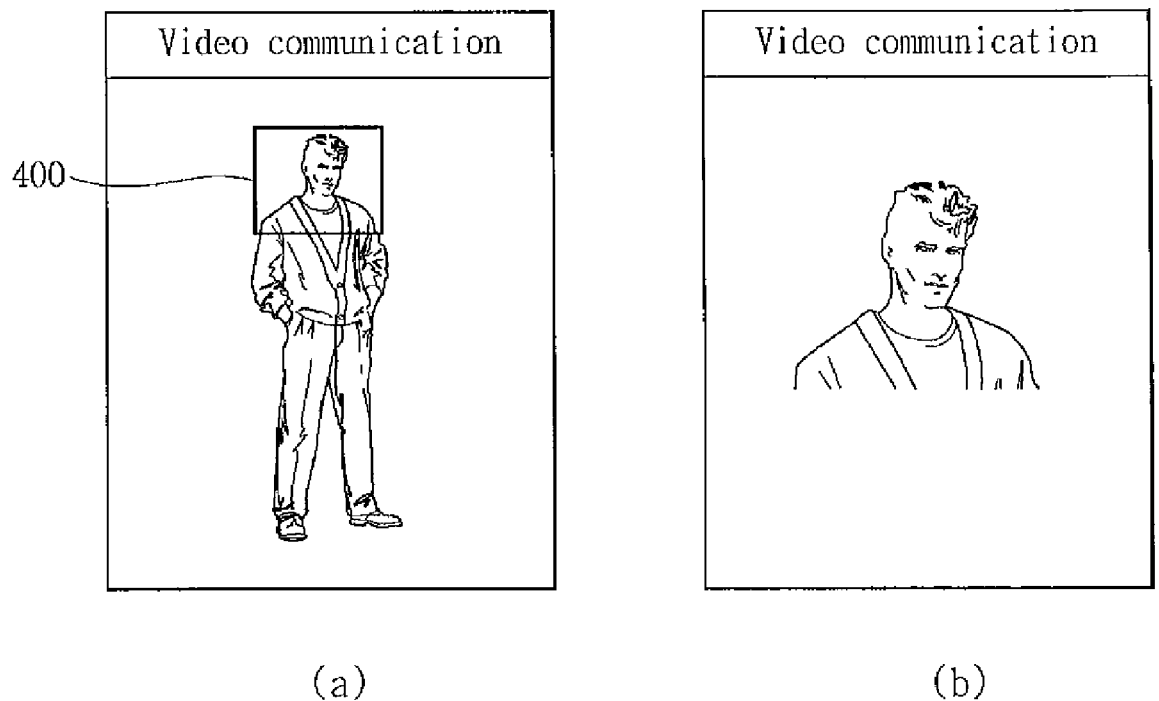
FIG. 15 shows an example in which some of a picture are focused at the time of picture communications.

FIG. 15 shows an example in which some of a picture are focused at the time of picture communications.

Video communication is performed using the mobile communication terminal 10 as illustrated in FIG. 15(a). The controller 150 may divide the display unit 130 into regions as described above and a user may move the focusing region indicator 400 in order to focus his face.

The controller 150 may magnify the user's face within the focusing region indicator 400 and transmit the magnified face to a counterpart's mobile communication terminal.

Thus, the received face may be seen in more detail in the counterpart's mobile communication terminal as illustrated in FIG. 15(b).

In the above embodiments, it has been described that the shape of the focusing region indicator 400 is a square and has a box shape having four sides. However, it is to be noted that the present invention is not limited to the example, but may be implemented in various ways. An alternative example is described below with reference to FIG. 16.

Figure 16A:
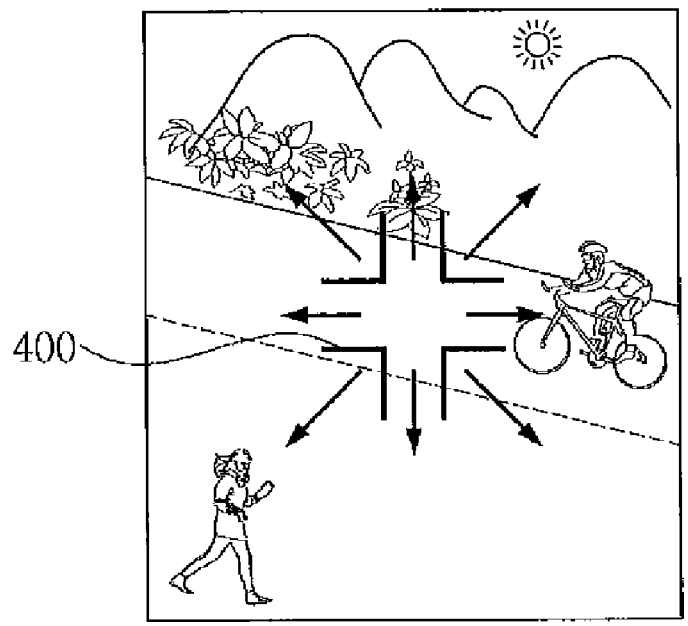
FIGS. 16a and 16b show examples illustrating shapes of a focusing region indicator.
Figure 16B:
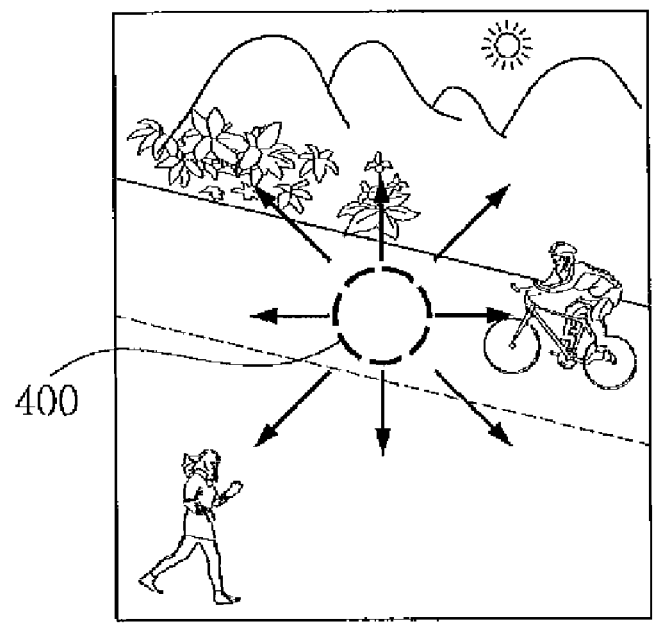

FIGS. 16a and 16b show examples illustrating shapes of a focusing region indicator.

The focusing region indicator 400 may have sides that are not connected to each other, as illustrated in FIG. 16a. Things indicating movable directions, and so on are the same as above.

The focusing region indicator 400 may have a circle as illustrated in FIG. 16b. Alternatively, the focusing region indicator 400 may have a variety of shapes, such as polygon.

In the above embodiments, it has been described that the frames of the focusing region indicator 400 are bold and highlighted. However, the present invention is not limited to the above embodiments. In other words, an image of a region where the focusing region indicator 400 is located and focused may be magnified or flicker.

In the above embodiments, it has been described that a specific key of the input unit 120, which corresponds to a focused region of the display unit 130, emits light. However, the present invention is not limited to the above embodiments. For example, a specific key of the input unit 120, which corresponds to a focused region of the display unit 130, may emit light, but light thereof may flicker.

Further, in the above embodiments, it has been described that the input unit 120 is a keypad. However, the input unit 120 may be a touch keypad. In this case, a touch key corresponding to a focused region of the display unit 130, of the touch keypad, may emit light.

Another Embodiment

When Touch Screen is Used

Figure 17:
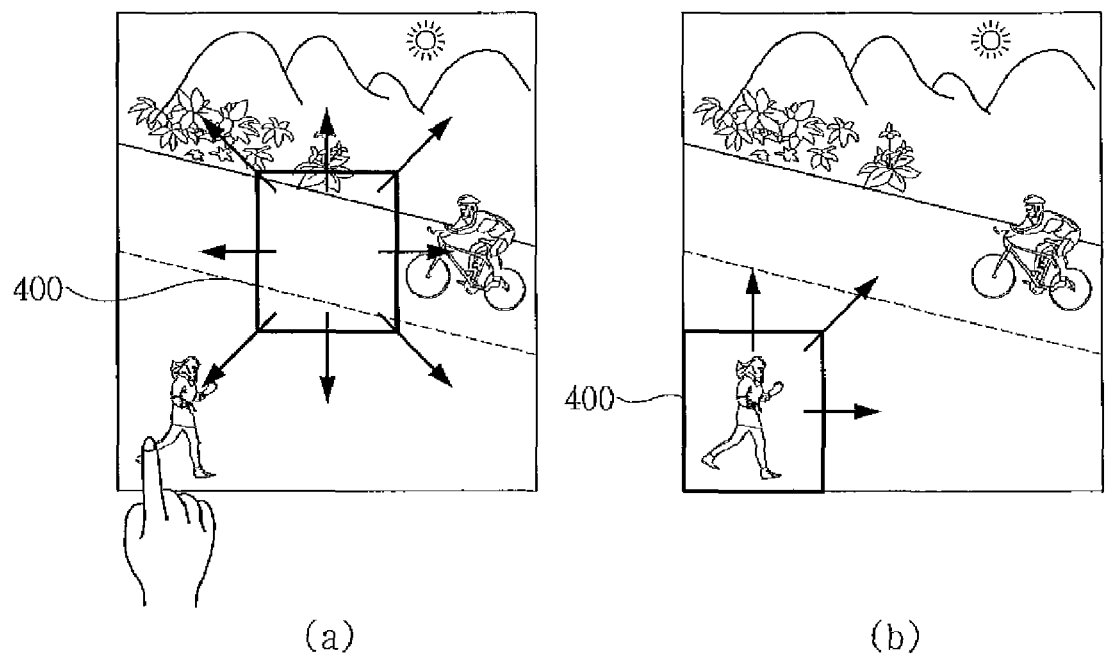
FIG. 17 shows an example in which a touch screen is divided into regions in which region demarcation lines are not displayed according to another embodiment of the present invention.

FIG. 17 shows an example in which a touch screen is divided into regions in which the region demarcation lines are not displayed according to another embodiment of the present invention.

According to another embodiment of the present invention, the display unit 130 may be a touch screen 130 as illustrated in FIG. 17(a). A touch region of the touch screen 130 may be set to a plurality of groups and divided into regions on which the region demarcation lines are not displayed so that the groups correspond to the divided regions as described above.

If a touch operation of the touch screen 130 is sensed, the controller 150 controls a specific region corresponding to a group of a corresponding touch region to be focused as illustrated in FIG. 17(b).

If two touch input signals are generated, the controller 150 controls corresponding regions to focused together. An example of this touch operation is described below with reference to FIG. 18.

Figure 18:
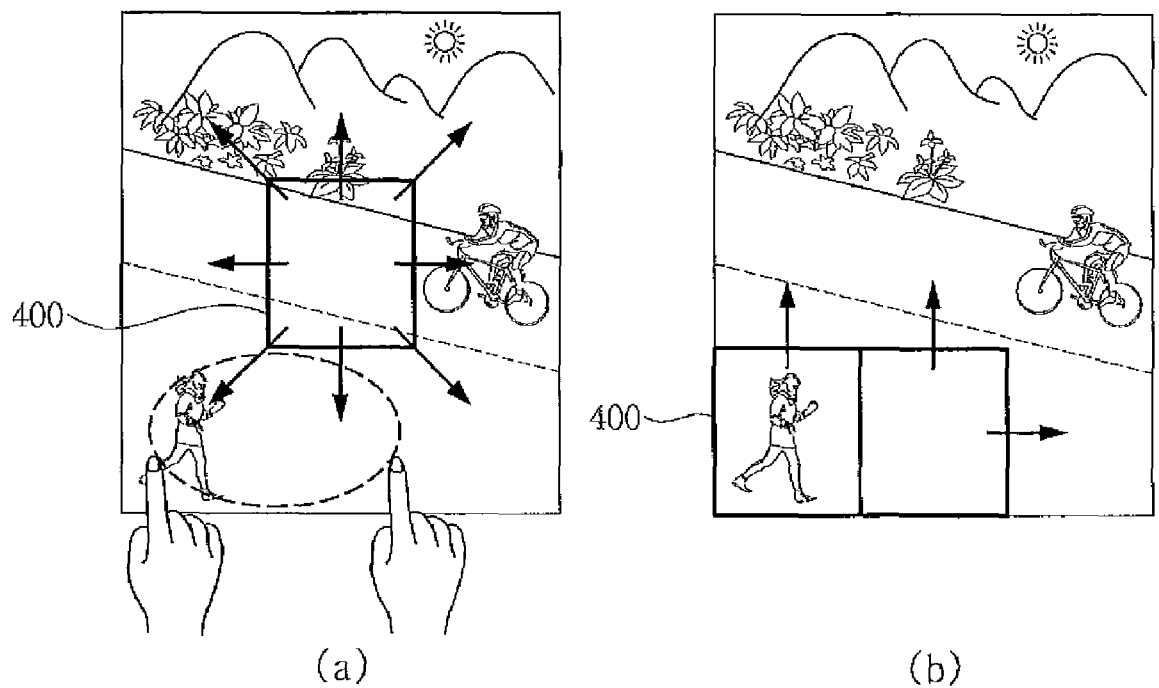
FIG. 18 shows an example in which corresponding regions are focused at the same time when two input signals are generated according to another embodiment of the present invention.

FIG. 18 shows an example in which corresponding regions are focused at the same time when two input signals are generated according to another embodiment of the present invention.

If a user touches regions to be focused on the touch screen 130 using touch means (for example, the user's fingers) as illustrated in FIG. 18(a), the controller 150 senses the touch operation and controls divided regions corresponding to the regions touched by the user to be focused together, as illustrated in FIG. 18(b).

In the above embodiments, it has been described that the input unit 120 is a keypad, a touch keypad or a touch screen. However, the present invention is not limited to the embodiments. For example, the direction key 122 may be used as the input unit 120. Alternatively, rotary input devices, such as a jog disk, a jog dial, and a jog shuttle, may be used.

In the above embodiments, it has been described that a specific portion of an image of a subject, which is captured by the camera unit 110, is captured. However, the present invention is not limited to the embodiments. For example, in the mobile communication terminal 10, not only images received through the communication module unit 100, but also all images displayed on the display unit 130 may be divided and then focused on a specific region.

In the above embodiments, it has been described that the focusing region indicator 400 is set by default. However, the present invention is not limited to the embodiments. For example, the controller 150 may control the location of the focusing region indicator 400, which was previously used finally, to be stored in the memory unit 140 and the location to be displayed by default when the focusing region indicator 400 is displayed on the display unit 130.

In the above embodiments, it has been described that the focusing method is applied to the mobile communication terminal 10. It is however to be understood that the focusing method may be applied to all devices equipped with a camera, such as a digital camera.

Further, the focusing method may also be applied to a case where focusing on a specific region of an image is necessary in devices such as computers.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, the present invention has the following advantages.

A desired region can be focused conveniently while easily viewing a displayed image since region demarcation lines are not displayed.

One or more regions of an image can be focused more conveniently.

What is claimed is:

1. A mobile communication terminal, comprising:
   a camera unit configured to capture an image of a subject for a video telephony call;
   a communication module configured to perform the video telephony call with another mobile communication terminal;
   a touch screen configured to receive one or more touch input signals, and to display the image of the subject on a display area of the touch screen, the display area divided into one or more regions in order to focus specific regions of the image;
   a focusing region indicator to indicate the specific region displayed on the screen, and region demarcation lines to demarcate the regions not displayed on the screen; and
   a controller configured to control each of the regions to be divided in response to the touch input signals in order to select the specific region, and the specific regions corresponding to the received touch input signals to be focused, so that other images corresponding to the specific regions are generated, and to transmit the generated images to the another mobile communication terminal for performing the video telephony call via the communication module wherein the number of the regions is changed by user.

2. The mobile communication terminal of claim 1, wherein the controller controls directions in which the focusing region indicator is movable to be displayed.

3. The mobile communication terminal of claim 1, wherein the controller controls the focused specific region or the focusing region indicator to be highlighted.

4. The mobile communication terminal of claim 1, wherein the controller controls the regions to be divided with different sizes.

5. The mobile communication terminal of claim 1, wherein a size of the region is changed by a user.

6. The mobile communication terminal of claim 1, wherein if two or more input signals are received, the controller controls the specific regions corresponding to the two or more touch input signals to be multi-focused at the same time.

7. The mobile communication terminal of claim 1, further comprising:
   a memory unit for storing the image of the specific region, wherein if the specific region is focused, the controller controls the image of the specific region to be captured and then stored in the memory unit.

8. The mobile communication terminal of claim 1, wherein:
   the divided regions on the display unit are set to a plurality of groups, and
   if any one of the divided regions is selected, the controller controls a region corresponding to a group including the selected region to be focused.

9. A focusing method in a mobile communication terminal, comprising:
   a capturing step of capturing an image of a subject for a video telephony call with another mobile communication terminal via a camera of the mobile communication terminal;
   a dividing step of dividing a display area of a touch screen on which the image of the subject is displayed into one or more regions in order to focus a specific region of the image, and region demarcation lines demarcate the region not displayed on the display area;
   a display step of displaying a focusing region indicator to indicted the specific region;
   an input step of receiving one or more touch input signals through the touch screen;
   a focusing step of focusing specific regions of the displayed image corresponding to the touch input signals;
   an image generating step of generating images on which the specific regions are focused; and
   transmitting the generated images to the another mobile communication terminal for performing the video telephony call via a communication module of the mobile communication terminal wherein the number of the divided regions is changed by the user.

10. The focusing method of claim 9, wherein in the focusing step, directions in which the focusing region indicator is movable are displayed.

11. The focusing method of claim 9, wherein in the focusing step, the focused specific region or the focusing region indicator is highlighted.

12. The focusing method of claim 9, wherein in the dividing step, the divided regions are divided with different sizes.

13. The focusing method of claim 9, wherein a size of each of the divided regions is changed by a user.

14. The focusing method of claim 9, wherein in the focusing step, if two or more touch input signals corresponding to the divided regions are received in the input signal receiving step, specific regions corresponding to the two or more touch input signals are multi-focused at the same time.

15. The focusing method of claim 9, wherein:
   in the image generating step, an image of a corresponding focused region is captured, and
   the focusing method further comprises a storage step of storing the captured image.

16. The focusing method of claim 9, wherein:
   the divided regions are set to a plurality of groups, and
   in the focusing step, if any one of the divided regions is selected, a region corresponding to a group including the selected region is focused at the same time.

* * * * *